United States Patent [19]

Stoyan

[11] Patent Number: 5,084,537

[45] Date of Patent: * Jan. 28, 1992

[54] UV-ABSORBING EXTENDED-WEAR LENSES

[75] Inventor: Nick Stoyan, Encino, Calif.

[73] Assignee: Bausch & Lomb, Incorporated, Rochester, N.Y.

[*] Notice: The portion of the term of this patent subsequent to Mar. 26, 2008 has been disclaimed.

[21] Appl. No.: 253,318

[22] Filed: Sep. 30, 1988

Related U.S. Application Data

[63] Continuation of Ser. No. 736,932, May 22, 1985, abandoned, which is a continuation-in-part of Ser. No. 696,014, Jan. 29, 1985, abandoned.

[51] Int. Cl.$^5$ ............ C08F 18/20; C08F 30/08
[52] U.S. Cl. ................... 526/245; 526/246; 526/247; 526/261; 526/279; 523/106
[58] Field of Search ......... 526/279, 245, 246, 247, 526/261; 523/106

[56] References Cited

U.S. PATENT DOCUMENTS

| | | | |
|---|---|---|---|
| 4,304,895 | 12/1981 | Loshaek | 526/313 |
| 4,433,125 | 2/1984 | Ichinohe et al. | 526/279 |
| 4,525,563 | 6/1985 | Shibata et al. | 526/279 |
| 4,602,074 | 7/1986 | Mizutoni et al. | 526/279 |
| 4,625,007 | 11/1986 | Ellis et al. | 526/279 |
| 4,780,515 | 10/1988 | Deichert | 526/279 |

FOREIGN PATENT DOCUMENTS 0131468 11/1985 Japan.

*Primary Examiner*—Thurman K. Page
*Assistant Examiner*—Peter F. Kulkosky
*Attorney, Agent, or Firm*—Christie, Parker & Hale

[57] ABSTRACT

There are provided extended-wear lenses formed by polymerizing an organosilicon monomer, a fluoroorgano monomer, a hydrophilic monomer, and a crosslinking agent. The product includes a benzotriazole and/or a benzophenone UV-absorbing agent and is is easily machinable to any prescription, permitting continuous wear, with oxygen permeability in excess of $50 \times 50^{-11}(cm^2/sec)(ml\ O_2 \times mm\ Hg)$ and a receding contact angle of less than 45° C. The bulk of the monomer content is the fluoorgano monomer and/or organosilicon monomer, which content is limited to 35 parts by weight, with lesser amounts being preferred.

17 Claims, No Drawings

UV-ABSORBING EXTENDED-WEAR LENSES

CROSS-REFERENCE TO RELATED APPLICATION

This application is a continuation-in-part of application Serial No. 696,014, filed Jan. 29, 1985, now abandoned.

BACKGROUND OF THE INVENTION

The present invention is directed to eye-compatible lenses, particularly hard contact lenses having excellent oxygen permeability and wettability.

Contact lenses presently on the market are classified into two large groups: soft contact lenses and hard contact lenses. Hard contact lenses are better able than soft contact lenses to retain visual characteristics, but are less comfortable. The art has sought to increase oxygen permeability of hard contact lenses, to extend the length of time they can be worn without causing corneal damage or discomfort.

One proposed solution has been the formation of a copolymer of methyl methacrylate and a siloxane methacrylate compound. This solution has been less than satisfactory, since the lenses offered are not as hard, rigid, nor wettable as lenses formed from polymethyl methacrylate. In addition, such lenses are fragile and have poor mechanical processability.

The object of the present invention is to overcome the deficiencies in the state of the art by offering lenses having a high degree of oxygen permeability, excellent wettability, and, if desired, ultraviolet absorption. The primary benefit of UV absorptivity is the resistance to user development of cataracts.

SUMMARY OF THE INVENTION

The present invention is directed to oxygen-permeable UV-absorbing lenses comprising copolymers of at least one organosilicon monomer which is preferably an organosilane or an organosiloxane of the general formula:

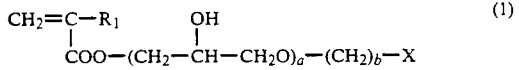
(1)

wherein $R_1$ is hydrogen or methyl, a is 0 or 1, b is from 1 to about 4, and X is an organosilicon moiety containing up to about 16 silicon atoms;

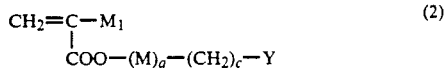
(2)

wherein $M_1$ is hydrogen, alkyl, fluoroalkyl, alkyl carboxy, carboxy ester, alkyl carboxy ester, fluorinated carboxy ester, fluorinated alkyl carboxy ester, cyano, or phenyl, M is hydroxy alkyl, alkyl ether, or hydroxy alkyl ether, a is as defined above, c is from 0 to 4, and Y is a fluorocarbon group, preferably containing from about 2 to about 21 fluorine atoms.

At least one hydrophilic monomer is included, preferably an unsaturated carboxylic acid capable of inducing wettability, and is present in an amount sufficient to provide in the resultant polymer a receding contact angle of about 45° or less. Methacrylic acid is preferred. At least one UV-absorbing agent is included. The UV-absorbing agent may be a UV-absorbing monomer, preferably hydroxylbenzophenone or a benzotriazole compound of the formula:

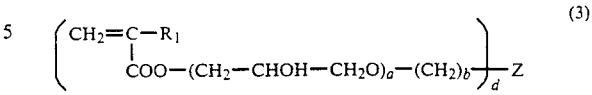
(3)

wherein $R_1$, a and b are defined as above, d is 1 or 2, and Z is

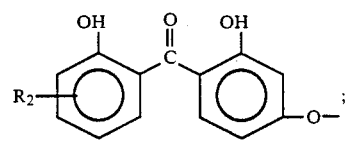

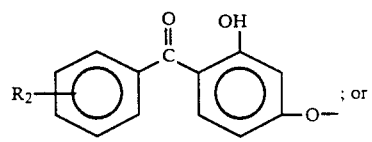
; or

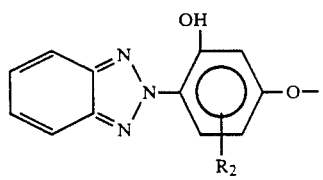

wherein $R_2$ is hydrogen, alkyl or hydroxy. Alternately or in addition, the UV-absorbing monomer may be a benzotriazole of the formula:

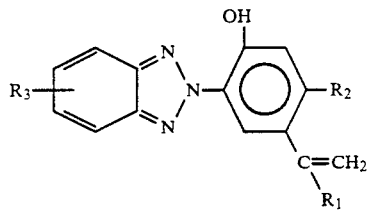

wherein $R_1$ and $R_2$ are as defined above, and $R_3$ is H or alkyl, preferably a $C_1$–$C_{10}$ alkyl, provided to induce UV absorbance to the lens.

The UV-absorbing agent may also be non-polymerizable homopolymers and copolymers, preferably containing UV-absorbing units which are added to the monomer system that undergoes polymerization and which become physically entrained in the formed lens.

In the polymerized state, the UV-absorbing monomers act as a UV filter or screen capable of preventing UV transmission to the eye. It is important that in this regard most of the complications associated with cornea aphakia and retina problems can be prevented. In addition, the phenolic moiety enhances wettability of the lens. Moreover, being compatible with the other monomers, the UV-absorbing monomers are readily copolymerized and permanently retained in the polymer chain. Migration to the polymer surface and leaching are avoided.

A final component is a crosslinking monomer which is a crosslinking agent, preferably a silicon monomer, present in an amount up to about 5, preferably up to about 2, percent by weight.

It has been found that the total organosilicon-monomer content of the polymer may range from about 10 to about 40 percent by weight, preferably from about 10 to about 35 percent by weight, more preferably 30 percent by weight. The hydrophilic monomer may be present in an amount of from about 1 to about 15 percent by weight, preferably from about 2 to about 10 percent by weight. The UV agent may be present in an amount of from about 0.1 to about 20 percent, preferably from about 2 to about 10 percent by weight, and the crosslinking monomer may be present in an amount up to about 2 percent by weight. All percentages are based on the total weight of the UV-absorbing agent and the monomers The balance of the monomer system may be solely the fluoroorgano monomers. It is desired that the lens have a Shore D hardness greater than about 78, preferably from about 80 to about 85. There may be desirably included other monomers such as acrylates, methacrylates, itaconic esters, styrenes, fluorinated styrenes, alkyl styrenes, fluorinated alkyl styrenes, and the like, present in a concentration of up to about 50 percent by weight of the concentration of the fluoroorgano monomer, typically in a concentration of up to about 5 percent by weight based on the total weight of the UV-absorbing agent and the monomers. Such monomers are used to modify properties such as hardness, machinability, wettability, oxygen permeability, and the like.

It is desired to provide an oxygen permeability at 35° C. greater than $50 \times 10^{-11}$ (cm$^2$/sec)(ml O$_2$ $\times$ mm Hg). When using low-cost fluoroorgano compounds such as 2,2,2-trifluoroethylmethacrylate, the organosilicon content of the monomer system must be high, typically in the range of from 25 percent to 30 percent or more by weight based on the total weight of the UV-absorbing agent and the monomers. Organosilicon monomer content can be advantageously reduced, however, by inclusion of high-performance fluoroorganomonomers such as hexafluoroisopropylmethacrylate.

DETAILED DESCRIPTION

The present invention is directed to eye-compatible, i.e., ocular-compatible, lenses, in particular, hard contact lenses, formed of an interpolymerized amount of at least one organosilicon monomer, at least one fluoroorgano compound, at least one monomeric unsaturated carboxylic-acid wetting agent, and a UV-absorbing agent which is preferably a monomer of benzotriazole and/or benzophenone, and at least one crosslinking monomer. Other reactive monomers such as acrylates, methacrylates, itaconic esters, styrenes, fluorinated styrenes, alkyl styrenes, fluorinated alkyl styrenes, and the like, may be included as part of the polymerizable composition, to achieve a lens of desired hardness, wettability, oxygen permeability, machinability, and the like.

The organosilicon monomers which may be used in accordance with the instant invention include organosilanes and/or organosiloxanes of the general formula:

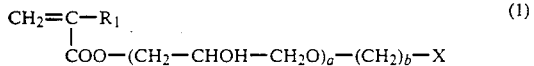
(1)

wherein R$_1$ is hydrogen or methyl, a is 0 or 1, b is from 1 to about 4, and X is an organosilicon moiety containing up to about 26 silicon atoms.

Preferred organosilicon compounds are acrylates and methacrylates of the general formula:

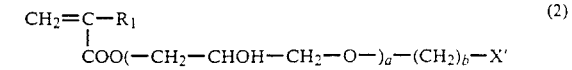
(2)

wherein X' is

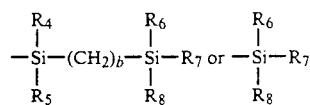

each of R$_4$ and R$_5$ is independently a C$_1$-C$_5$ alkyl, phenyl, or —O—Si(CH$_3$)$_3$, and each of R$_6$, R$_7$ and R$_8$ is independently selected from C$_1$-C$_5$; —CH$_2$=CH$_2$; phenyl; —CH$_2$OH;

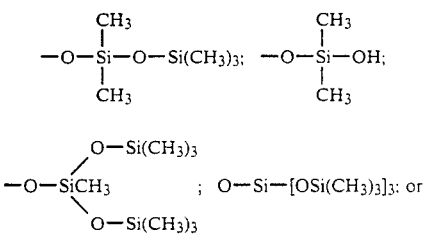

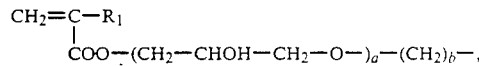

wherein R$_1$, a, and b are as defined above.

The representative monomers included are:
tris(trimethylsiloxy)silylpropylmethacrylate,
1,3-bis(γ-methacryloxypropyl)-1,1,3,3,-tetra(trimethylsiloxy)disiloxane,
vinyl di(trimethylsiloxy)silylpropylmethacrylate,
pentamethyldisiloxy-γ-methacryloxypropylsilane,
trimethylsilylpropylmethacrylate,
methyl di(trimethylsiloxy)silylpropylmethacrylate, and
tris(trimethylsiloxy)silylpropylglycerolmethacryalte,
and the like. Tris(trimethylsiloxy)-γ-methacryloxypropylsilane is presently preferred. Another important monomer is 1,3-bis-(γ-methacryloxypropyl)-1,1,3,3-tetra(trimethylsiloxy)disiloxane, as it serves as a crosslinking agent without sacrificing oxygen permeability. When used for this purpose, concentration may vary from about 0.1 to about 2 parts by weight based on the total weight of the reactants.

Other useful organosilicon monomers are disclosed in U.S. Pat. Nos. 4,152,508 to Ellis; 4,153,641 to Deichert et al; 4,189,546 to Deichert et al: and 4,463,149 to Ellis. each incorporated herein by reference.

While concentrations of organosilicon monomers may range from about 10 to about 40 parts by weight based on the total weight of the UV-absorbing agent and the monomers, the preferred range is from about 10 to about 35, more preferably from about 20 to about 30 parts by weight. Oxygen permeability (all other factors being constant) will increase with an increase in organosilicon monomer content. At higher levels, the lens becomes more difficult to machine, requiring the inclusion of monomers as part of the monomer system, as mentioned above, to yield a lens having a Shore D hardness greater than about 78, preferably from about 80 to about 85.

The fluoroorgano monomers utile in the practice of the instant invention are generally compounds of the formula:

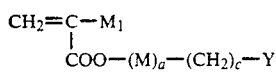   (3)

wherein $M_1$ is hydrogen, alkyl, fluoroalkyl, alkyl carboxy, carboxy ester, alkyl carboxy ester, fluorinated carboxy ester, fluorinated alkyl carboxy ester, cyano, or phenyl, M is hydroxy alkyl, alkyl ether, or hydroxy alkyl ether, a is as defined above, c is from 0 to 4, and Y is a fluorocarbon group, preferably containing from about 2 to about 21 fluorine atoms. Preferably, Y has the formula:

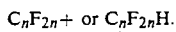

Illustrative of fluoroorgano monomers are:
2,2,2-trifluoroethylmethacrylate,
hexafluorobutylmethacrylate,
hexafluoroisopropylmethacrylate,
pentafluoro-n-propylmethacrylate, and the like. Trifluoroisopropylmethacrylate is the preferred monomer for oxygen permeability, with 2,2,2-trifluoroethylmethacrylate being preferred for cost. Perfluoro or fluorinated styrenes may also be used.

Hydrophilic monomers are included in the composition to induce wettability. They preferably comprise an unsaturated carboxylic acid, most preferably methacrylic acid, for compatability of monomers and wearer comfort. Acrylic acid is functional but less desirable. Other monomers such as 2-hydroxyethylmethacrylate and the like may be used. Concentration may be from about 0.1 to about 15 or more percent by weight, preferably from about 2 to about 10 percent by weight based on the total weight of the UV-absorbing agent and the monomers.

The amount of hydrophilic monomer present depends on the amount of UV-absorbing agent, as described below, is employed, as the latter also has the capability of being a hydrophilic agent. Whether in monomeric or in polymeric form, its concentration may range from about 0.1 to about 20 percent by weight, preferably from about 2 to about 10 percent by weight based on the total weight of the monomers. The UV absorbing agents used herein are preferably in a polymerized form and cooperate with the hydrophilic monomer to induce wettability and antisepticability, i.e., self-sterilizable, in consequence of hydroxy-substituted benzene moieties. In the polymerized state, the UV absorbers absorb in the range of from about 300 nm to about 450 nm, preferably with no less than about 70% UV radiation at 370 nm. Preferred UV-absorbing agents are, or are formed of, monomers of the formula:

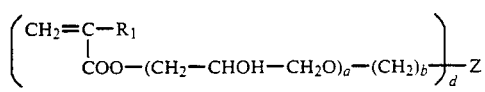   (4)

wherein $R_1$ is hydrogen or methyl, a is 0 or 1, b is from about 1 to about 4, d is 1 or 2, and Z is:

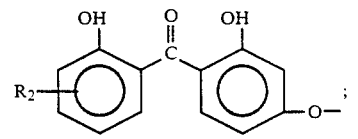

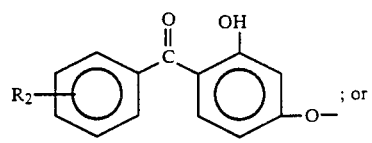

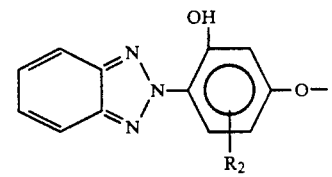

wherein $R_2$ is hydrogen; an alkyl, preferably a $C_1$-$C_5$ alkyl or hydroxyl, and c is 1 or 2. In the alterative or in addition, there may be employed a phenyl benzotriazole of the formula:

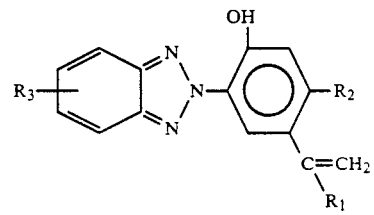

wherein $R_1$ and $R_2$ are as defined above, preferably a $C_1$-$C_{10}$ alkyl, and $R_3$ is H, alkyl, preferably a $C_1$-$C_{10}$ alkyl, or hydroxyl.

Preferred UV absorbers include:
2-hydroxy-4-(2-methacryloyloxyethoxy)benzophenone,
2-hydroxy-4-(2-acryloyloxyethoxy)benzophenone,
2-hydroxy-4-(2-hydroxy-3-methacryloxypropyl)benzophenone,
2-(2-hydroxy-5-vinylphenyl)-2H-benzotriazole, and the like.

The UV-absorbing agents are either part of the monomer system or are high-molecular-weight, non-polymerizable homopolymers or copolymers preferably containing such monomers as described above or other UV-absorbing units. They are reacted as such with the polymerizable monomer system and are entrained in the polymerization product.

The hard contact lenses of the instant invention are formulated to have high oxygen permeability (Dk) of at least about 15 and preferably greater than 50, as expressed in units of $10^{-11}(cm^2/sec)(ml\ O_2 \times mm\ Hg)$ and as determined at 35° C. Values are achieved using high concentrations of the organosilicon monomer and/or selection of the fluoroorgano monomer. With compositions of high organosilicon-monomer content there are displayed increased brittleness and a reduction in capability to undergo machining. At least one crosslinking agent, such as a multi-functional organosilicon monomer, a fluoroorgano monomer, or other modifying monomer, is employed in an amount sufficient to control hardness of the lens in the range of Shore D hardness of from about 80 to about 85. A highly multi-functional organosilicon monomer is preferred, as it does not interfere with oxygen permeability. Other crosslinking agents which may be used include ethylene glycol dimethacrylate, ethylene glycol diacrylate, diethylene glycol dimethacrylate, diethylene glycol diacrylate, and the like.

Lens formation is by free radical polymerization such as azobisisobutyronitrile (AIBN) and peroxide catalysts under conditions set forth in U.S. Pat. No. 3,808,179, incorporated herein by reference. Colorants and the like may be added prior to monomer polymerization. It is preferred to form the lens base in sheet form between layers of a non-adherent surface. The sheet is cut into smaller lens precursors from which the lens is ground to user specifications. Spin-casting, as described for instance in U.S. Pat. No. 3,408,429, incorporated herein by reference, may also be used.

Without limiting, the following Examples are illustrative of the instant invention. With reference to the Examples, properties of the contact lenses were measured according to the following methods.

Oxygen permeability values were determined using a test method developed by Dr. Irving Fatt of Berkeley, Calif. The instrument was a polarographic cell with a curved surface for finished lenses, polarographic amplifier, recorder and a constant temperature chamber equipped with a temperature control unit. The measurements were made at 35° C. and the units of oxygen permeability (Dk) are $(cm^2/sec)(ml\ O_2 \times mm\ Hg)$.

The water wettability of the contact lens material was determined by the sesile drop method using a RameHart goniometer with an environmental chamber. Both the advancing and the receding contact angles were determined.

The hardness was measured as Shore D at 22° C. using a hardness tester, and percent light transmission was measured using a recording spectrophotometer.

The absorption spectra of the copolymer were determined on a "Perkin Elmer" UV-Vis spectrophotometer using 0.1–0.15 mm-thin optically polished discs. The amount of materials extractable from the lenses were evaluated by first storing them in a saline solution for 10 days at 35° C. The lenses were then rinsed with distilled water, dried, weighed, and placed in stoppered, 25 cc volumetric flasks, again containing saline as the extracting medium. The saline was analyzed daily for its extracted ultraviolet absorber by placing 4 cc of the extract in a spectrophotometer cell and determining the absorption at 320 nm. The absorption values were compared against the calibration curve made for the pure ultraviolet absorber. Extractables can also be determined by the Soxhlet extraction method, using water as the solvent. The amount of extractables was determined only for a few of the materials in the Examples. Based on 0.04 gr average lens weight, extractables were found, on the average, to be less than $1 \times 10^{-4}$ mc grams/lens/day.

For a few selected copolymer materials, the leachability-diffusibility was evaluated by cytotoxicity assay-agar overlay method.

The assay is based on the method described by Guess, W. L., Rosenbluth, S. A., Schmidt, B., and Autian, J., in "Agar Diffusion Method for Toxicity Screening of Plastics on Cultured Cell Monolayers", J. Pharm. Sci. 54:1545–1547, 1965, incorporated herein by reference, and is designed to detect the response of a mammalian monolayer cell culture to readily diffusible components from materials or test solutions applied to the surface of an agar layer overlaying the monolayer.

The response of the cell monolayer is evaluated, with respect to the discoloration of the red-stained monolayer, under and around the sample when the petri dish is viewed against a white background. Loss of color of the stained cells is considered to be a physiologically significant reaction of the cells. The extent of discoloration is confirmed by examination of the monolayer on an inverted microscope, and the extent of lysis of the cells within the discoloration zone is estimated. Typically, discoloration of cells precedes lysis, as manifested by a region and a region showing lysis. A sample is reported as "cytotoxic" only if lysis is observed.

EXAMPLE 1

An oxygen-permeable copolymer was prepared from a mixture of 25 parts by weight of tris(trimethylsiloxy-)-γ-methacryloxypropylsilane, 65 parts by weight of trifluoroethylmethacrylate, 5 parts by weight of 2-hydroxy-4-(2-acryloxyethoxy)benzophenone, 5 parts by weight of methacrylic acid, and 0.02 parts by weight of AIBN.

The mixture was homogenized, degassed and placed in a polymerization cell made of two glass plates separated by a seal and held together by spring clamps. After filling, the cell was purged with nitrogen, sealed and placed in a circulating water bath at 60° C. for 10 hours. After the initial polymerization period, the cell was heated at 80° C. for 3 hours, 100° C. for one hour, and then allowed to cool to room temperature. The clamps were then removed and the transparent sheet heated for 2 hours at 100° C. The plastic sheet, about 14-inch in thickness, was cut into squares, then formed to discs which were used to prepare corneal contact lenses using conventional hard-contact-lens-making equipment. The properties of this lens material are shown in Table I.

TABLE I

| Properties | Example 1 |
|---|---|
| Oxygen Permeability | 54 |
| Contact Angle | 20 |
| Light Transmission | Transparent |
| Hardness | 84 |
| Cytotoxicity Assay | Negative |

EXAMPLES 2–22 AND CONTROL A

Following the procedure of Example 1, additional polymers were formed for lens sue. The composition, in parts-by-weight of reactants and lens properties, are shown in Table II. The Control does not include a hydrophilic monomer nor a UV-absorbing monomer.

TABLE II

Examples 2–22 and Control A

| | Examples 2–13 (parts by weight) | | | | | | | | | | | |
|---|---|---|---|---|---|---|---|---|---|---|---|---|
| Reactant | 2 | 3 | 4 | 5 | 6 | 7 | 8 | 9 | 10 | 11 | 12 | 13 |
| Tris(Trimethylsiloxy)silylpropylmethacrylate | 9.5 | 19 | 29 | 9.5 | 19 | 29 | 19 | 19 | 19 | 19 | 19 | 19 |
| 1,3-bis(γ-methacryloxypropyl)-1,1,3,3-tetra | .5 | 1 | 1 | .5 | 1 | 1 | 1 | 1 | 1 | 1 | 1 | 1 |

TABLE II-continued

Examples 2-22 and Control A

| | | | | | | | | | | | | |
|---|---|---|---|---|---|---|---|---|---|---|---|---|
| (trimethylsiloxy)disiloxane | | | | | | | | | | | | |
| Vinyl di(trimethyldiloxy)silylpropylmethacrylate | | | | | | | | | | | | |
| Pentamethyldisiloxy-γ-methacryloxypropylsilane | | | | | | | | | | | | |
| Trimethylsilylpropylmethacrylate | | | | | | | | | | | | |
| Methyl di(trimethylsiloxy)silylpropylglycerol- | | | | | | | | | | | | |
| 2,2,2-trifluoroethylmethacrylate | 80 | 70 | 60 | 80 | 70 | 60 | | | 70 | 72 | 68 | 68 |
| Hexafluorobutylmethacrylate | | | | | | | 70 | | | | | |
| Hexafluoroisopropylmethacrylate | | | | | | | | 70 | | | | |
| n-Butylmethacrylate | | | | | | | | | | 2 | | |
| 2-Ethylhexylmethacrylate | | | | | | | | | | | | 2 |
| Methacrylic Acid | 5 | 5 | 5 | 5 | 5 | 5 | 5 | 5 | 5 | 5 | 5 | 5 |
| 2-Hydroxyethylmethacrylate | | | | | | | | | | | | |
| Ethyleneglycoldimethacrylate | | | | | | | | | | | | |
| AIBN | .02 | .02 | .02 | .02 | .02 | .02 | .02 | .02 | .02 | .02 | .02 | .02 |
| 2-Hydroxy-4-(2-methacryloyloxyethoxy)benzophenone | 5 | 5 | 5 | | | | | | | | 5 | 5 |
| 2-Hydroxy-4-(2-acryloyloxytehoxy)benzophenone | | | | 5 | 5 | 5 | 5 | 5 | | | | 5 |
| 2-Hydroxy-4-(2-hydroxy-3-methacryloxypropyl) benzophenone | | | | | | | | 5 | | | | |
| 2-(2-Hydroxy-5-vinylphenyl)-2H-benzotriazole | | | | | | | | | 3 | | | |
| Properties | | | | | | | | | | | | |
| Oxygen Permeability* | 15 | 25 | 75 | 15 | 25 | 75 | 38 | 220 | 24 | 25 | 24 | 24 |
| Contact Angle, receding | 13 | 15 | 23 | 13 | 15 | 23 | 24 | 25 | 15 | 17 | 17 | 17 |
| Light Transmission | T | T | T | T | T | T | T | T | T | T | T | T |
| Hardness | 82 | 83 | 84 | 81 | 82 | 83 | 80 | 81 | 84 | 84 | 84 | 81 |
| Others | | | B | | | B | | | | | | |
| Cytotoxicity Assay | N | | | | | | N | N | N | | N | |

| | Examples 14–22 (parts by weight) | | | | | | | | Control |
|---|---|---|---|---|---|---|---|---|---|
| Reactant | 14 | 15 | 16 | 17 | 18 | 19 | 20 | 21 | 22 | A |
| Tris(Trimethylsiloxy)silylpropylmethacrylate | 19 | 19 | 17 | 17 | | | | | | 19 |
| 1,3-bis(γ-methacryloxypropyl)-1,1,3,3-tetra (trimethylsiloxy)disiloxane | 1 | 1 | 3 | 3 | | | | | | |
| Vinyl di(trimethyldiloxy)silylpropylmethacrylate | | | | | 20 | | | | | |
| Pentamethyldisiloxy-γ-methacryloxypropylsilane | | | | | | 20 | | | | |
| Trimethylsilylpropylmethacrylate | | | | | | | 20 | | | |
| Methyl di(trimethylsiloxy)silylpropylglycerol-methacrylate | | | | | | | | 20 | 20 | |
| 2,2,2-trifluoroethylmethacrylate | 68 | 65 | 70 | 70 | 67 | 67 | 67 | 67 | 67 | 80 |
| Hexafluorobutylmethacrylate | | | | | | 70 | | | | |
| Hexafluoroisopropylmethacrylate | | | | | | | 70 | | | |
| n-Butylmethacrylate | | | | | | | | | | |
| 2-Ethylhexylmethacrylate | | | | | | | | | | |
| Methacrylic Acid | 5 | 5 | 5 | 5 | 5 | 5 | 5 | 5 | | |
| 2-Hydroxyethylmethacrylate | | 5 | | | | | | | | |
| Ethyleneglycoldimethacrylate | 2 | | | | 3 | 3 | 3 | 3 | 3 | |
| AIBN | .02 | .02 | .02 | .02 | .02 | .02 | .02 | .02 | .02 | .02 |
| 2-Hydroxy-4-(2-methacryloyloxyethoxy)benzophenone | 5 | | | | | | | | | |
| 2-Hydroxy-4-(2-acryloyloxytehoxy)benzophenone | 5 | 5 | | 5 | 5 | 5 | 5 | 5 | 5 | |
| 2-Hydroxy-4-(2-hydroxy-3-methacryloxypropyl) benzophenone | | | | | | | | | | |
| 2-(2-Hydroxy-5-vinylphenyl)-2H-benzotriazole | | | | | | | | | | |
| Properties | | | | | | | | | | |
| Oxygen Permeability* | 23 | 22 | 23 | 22 | 25 | 22 | 13 | 23 | 21 | 32 |
| Contact Angle, receding | 27 | 13 | 17 | 18 | 22 | 21 | 17 | 21 | 10 | 39 |
| Light Transmission | T | T | T | T | T | T | T | T | T | T |
| Hardness | 82 | 83 | 82 | 82 | 83 | 83 | 82 | 84 | 84 | 83 |
| Others | | | B | B | | | | | | |
| Cytotoxicity Assay | | | | N | | | | | | |

T = transparent
B = brittle
N = negative
* $\times 10^{-11}$ (cm$^2$/sec)(ml O$_2$ × mm Hg)

EXAMPLE 23

Following the procedure of Examples 1-14, lenses were made from a polymer formed by polymerizing 24 parts by weight tris(trimethylsiloxy)silylpropylmethacrylate, 1 part by weight 1,3 bis(γ-methacryloxypropyl)-1,1,3,3-tetra(trimethylsiloxy)disiloxane, 5 parts by weight methacrylic acid, 5 parts by weight 2-hydroxy-4-(2-acryloxyethoxy)benzophenone, and 65 parts by weight 2,2,2-trifluoroethylmethacrylate. The lenses formed were transparent, with an oxygen permeability of $54 \times 10^{-11}$ (cm$^2$/sec)(ml O$_2$×mm Hg) and a receding contact angle of about 20° C.

Two evaluations were made. In one, over 300 persons wore fitted lenses during normal waking hours. Another group wore the lenses 24 hours per day. Both groups wore the lenses for protracted periods of time without discomfort. In another study, patients unable to wear soft lenses, or any other commercial oxygen-permeable lens, were able to wear the lenses with complete comfort. Clinical reports from participating doctors suggest that the lenses performed better and were safer than any other lens used, and also suggest a potential for years of trouble-free wear. Patients confirmed excellent wettability, no forming of film or deposit, and no sensitivity to glare. These results were unexpected, because silicon compounds do not wet well and are not durable.

EXAMPLE 24

Following the procedure of Examples 1-14, an oxygen-permeable copolymer was prepared from a mixture of 22 parts by weight tris(trimethylsiloxy)-γ-methacryloxypropylsilane, 2.7 parts by weight hydroxy-di(-trimethylsiloxy)silylpropylmethacrylate, 0.3 parts by weight 1,3 bis(γ-methacryloxypropyl)-1,1,3,3-tetra(-trimethylsiloxy)disiloxane, 65 parts by weight trifluoroethylmethacrylate, 5 parts by weight 2-hydroxy-4-(2-acryloxyethoxy)benzophenone, 5 parts by weight methacrylic acid, and 0.02 parts by weight AIBN. The properties of this lens material are shown in Table II.

TABLE III

| Oxygen Permeability | 54 |
| --- | --- |
| Contact Angle | 20 |
| Light Transmission | Transparent |
| Hardness | 84 |
| Cytotoxicity Assay | Negative |

What is claimed is:

1. An oxygen-permeable UV-absorbing contact lens consisting essentially of at least one UV-absorbing agent containing a polymerized amount of a monomer selected from the group consisting of:
2-hydroxy-4-(2-methacryloyloxyethoxy)benzophenone,
2-hydroxy-4-(2-acryloyloxyethoxy)benzophenone,
2-hydroxy-4-(2-hydroxy-3-methacryloxypropyl)benzophenone,
2-(2-hydroxy-5-vinylphenyl)-2H-benzotriazole, and the mixtures thereof,
the total amount of UV-absorbing agent present being in an amount of from about 0.1 to about 20 percent by weight of a polymer consisting essentially of:

(a) an organosilicon monomer system consisting essentially of monomers of the formula:

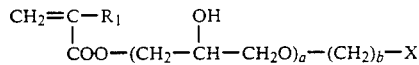

wherein $R_1$ is hydrogen or methyl, a is 0 or 1, b is from 1 to about 4, and X is an organosilicon moiety containing up to about 16 silicon atoms, the total organosilicon monomer being present in an amount of from about 30 to about 40 percent by weight based on the total weight of the UV-absorbing agent and the monomers, (b) at least one hydrophilic monomer present in an amount sufficient to provide in the resultant polymer a contact angle of less than about 45°;

(c) at least one crosslinking monomer, the total of crosslinking monomer being present in an amount up to about 5 percent by weight based on the total weight of the monomers; and (d) the balance of the monomers consisting essentially of at least one fluoroorgano monomer of the formula:

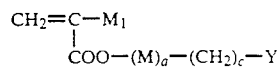

wherein $M_1$ is hydrogen, alkyl, fluoroalkyl, alkyl carboxy, carboxy ester, alkyl carboxy ester, fluorinated carboxy ester, cyano, or phenyl, M is hydroxy alkyl, alkyl ether, or hydroxy alkyl ether, a is as defined above, c is from 0 to 4, and Y is a fluorocarbon group preferably containing from about 2 to about 21 fluorine atoms, said lens having a shore D hardness greater than about 78 and an oxygen permeability of at least about $75 \times 10^{-11}$ (cm$^2$/sec) (ml O$_2 \times$ mm Hg).

2. An oxygen-permeable UV-absorbing lens as claimed in claim 1 in which the UV-absorbing homopolymer or copolymer comprises an interpolymerized amount of at least one UV-absorbing monomer selected from the group consisting of a hydroxybenzophenone or benzotriazole of the formula:

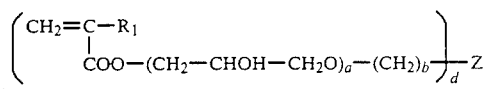

wherein $R_1$ is hydrogen or methyl, a is 0 or 1, b is from 1 to about 4, and Z is:

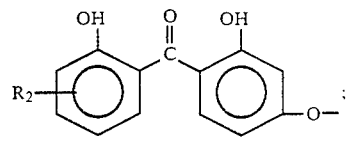

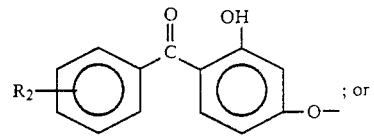

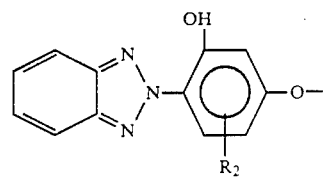

wherein $R_2$ is hydrogen, alkyl or hydroxy and a phenyl benzotriazole of the formula:

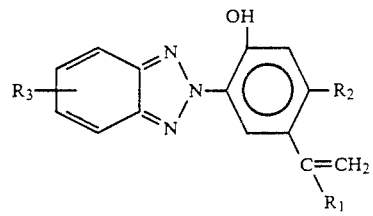

wherein $R_1$ and $R_2$ are as defined above, and $R_3$ is H; alkyl, preferably a $C_1$-$C_{10}$ alkyl, or hydroxyl.

3. An oxygen-permeable contact lens formed of a polymer consisting essentially of an interpolymerized amount of:

(a) an organosilicon monomer system consisting essentially of monomers of the formula:

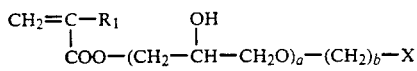

wherein $R_1$ is hydrogen or methyl, a is 0 or 1, b is from 1 to about 4, and X is an organosilicon moiety containing up to about 16 silicon atoms, the total organosilicon monomer being present in an amount of from about 30 to about 35 percent by weight based on the total weight of the monomers;

b) at least one UV-absorbing monomer selected from the group consisting of:
2-hydroxy-4-(2-methacryloyloxyethoxy)benzophenone,
2-hydroxy-4-(2-acryloyloxyethoxy)benzophenone,
2-hydroxy-4-(2-hydroxy-3-methacryloxypropyl)benzophenone,
2-(2-hydroxy-5-vinylphenyl)-2H-benzotriazole, and the mixtures thereof,
said UV-absorbing monomer being present in an interpolymerized amount of from about 0.1 to about 20 percent by weight based on the total weight of the monomers;

c) at least one hydrophilic monomer present in an amount sufficient to provide in the resultant polymer a contact angle of less than about 45°;

d) at least one crosslinking monomer, the total of crosslinking monomer being present in an amount up to about 5 percent by weight based on the total weight of the monomers; and e) the balance of the monomers consisting essentially of at least one fluoroorgano monomer of the formula:

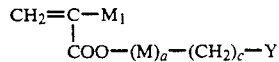

wherein $M_1$ is hydrogen, alkyl, fluoroalkyl, alkyl carboxy, carboxy ester, alkyl carboxy ester, fluorinated carboxy ester, fluorinated alkyl carboxy ester, cyano, or phenyl, M is hydroxy alkyl, alkyl ether, or hydroxy alkyl ether, a is as defined above, c is from 0 to 4, and Y is a fluorocarbon group preferably containing from about 2 to about 21 fluorine atoms, said lens having a Shore D hardness greater than about 78 and an oxygen permeability of at least about $75 \times 10^{-11}$ (cm$^2$/sec) (ml $O_2 \times$ mm Hg).

4. An oxygen-permeable UV-absorbing lens as claimed in claim 3 in which the organosilicon monomer is present in a concentration of from about 30 to about 35 percent by weight based on the total weight of interpolymerized monomers.

5. An oxygen-permeable UV-absorbing lens as claimed in claim 3 in which the organosilicon monomers are selected from the compounds of the formula:

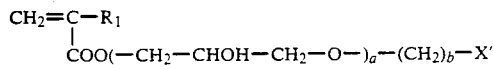 (2)

wherein R' is

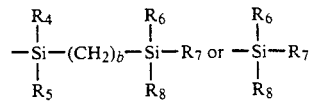

wherein each of $R_4$ and $R_5$ is independently a $C_1$-$C_5$ alkyl, phenyl, hydroxyl, or —O—Si(CH$_3$)$_3$, and each of $R_6$, $R_7$ and $R_8$ is independently selected from $C_1$-$C_5$; —CH$_2$=CH$_2$; phenyl; hydroxyl; —CH$_2$OH;

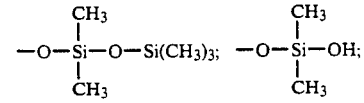

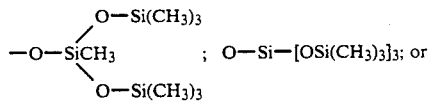

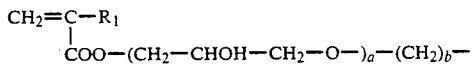

wherein $R_1$ is hydrogen or alkyl, a is 0 or 1, and b is from 1 to about 4.

6. An oxygen-permeable UV-absorbing lens as claimed in claim 1 in which the organosilicon monomer is selected from tris(trimethylsiloxy)-γ-methacryloxypropylsilane, 1,3-bis-(γ-methacryloxypropyl-)1,1,3,3-tetra(trimethylsiloxy)disiloxane and mixtures thereof.

7. An oxygen-permeable UV-absorbing lens as claimed in claim 3 in which the organosilicon monomer is selected from tris(trimethylsiloxy)-γ-methacryloxypropylsilane, 1,3-bis-(γ-methacryloxypropyl-)1,1,3,3-tetra(trimethylsiloxy)disiloxane and mixtures thereof.

8. An oxygen-permeable UV-absorbing lens as claimed in claim 1 in which the fluoorgano monomer is 2,2,2-trifluoroethylmethacrylate, hexafluorobutylmethacrylate, hexafluoroisopropylmethacrylate and mixtures thereof.

9. An oxygen-permeable UV-absorbing lens as claimed in claim 6 in which the fluoorgano monomer is 2,2,2-trifluoroethylmethacrylate, hexafluorobutylmethacrylate, hexafluoroisopropylmethacrylate and mixtures thereof.

10. An oxygen-permeable UV-absorbing lens as claimed in claim 3 in which the fluoorgano monomer is 2,2,2-trifluoroethylmethacrylate, hexafluorobutylmethacrylate, hexafluoroisopropylmethacrylate and mixtures thereof.

11. An oxygen-permeable UV-absorbing lens as claimed in claim 7 in which the fluoorgano monomer is 2,2,2-trifluoroethylmethacrylate, hexafluorobutylmethacrylate, hexafluoroisopropylmethacrylate and mixtures thereof.

12. An oxygen-permeable UV-absorbing lens as claimed in claim 1 in which the hydrophilic monomer is methacrylic acid.

13. An oxygen-permeable UV-absorbing lens as claimed in claim 4 in which the hydrophilic monomer is methacrylic acid.

14. An oxygen-permeable UV-absorbing lens as claimed in claim 11 in which the hydrophilic monomer is methacrylic acid.

15. An oxygen-permeable contact lens consisting essentially of an interpolymerized amount of:

a) an organosilicon monomer system consisting essentially of monomers of the formula:

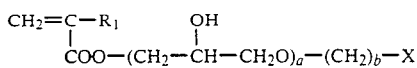

wherein $R_1$ is hydrogen or methyl, a is 0 or 1, b is from 1 to 4, and X is an organosilicon moiety containing up to about 16 silicon atoms, the total organosilicon monomer being present in an amount of from about 30 to about 40 percent by weight based on the total weight of the monomers;

b) a UV-absorbing monomer selected from the group consisting of:
2-hydroxy-4-(2-methacryloyloxyethoxy)benzophenone,
2-hydroxy-4-(2-acryloyloxyethoxy)benzophenone,
2-hydroxy-4-(2-hydroxy-3-methacryloxypropyl)benzophenone,
2-(2-hydroxy-5-vinylphenyl)-2H-benzotriazole, and the mixtures thereof,
present in an interpolymerized amount of from about 2 to about 10 percent by weight based on the total weight of the monomers;

c) methacrylic acid in an amount sufficient to provide in the resultant polymer a contact angle of less than about 45°;

d) at least one crosslinking monomer, the total of crosslinking monomers being present in a concentration of from about 0.01 to about 2 percent by weight based on the total weight of the monomers; and e) the balance of the monomers comprising solely fluoroorgano monomers consisting essentially of fluoroorgano monomers of the formula:

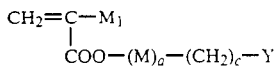

wherein $M_1$ is hydrogen, alkyl, fluoroalkyl, alkyl carboxy, carboxy ester, alkyl carboxy ester, fluorinated carboxy ester, cyano, or phenyl, M is hydroxy alkyl, alkyl ether, or hydroxy alkyl ether, a is as defined above, c is from 0 to 4, and Y is a fluorocarbon group preferably containing from about 2 to about 21 fluorine atoms, said lens having a Shore D hardness greater than about 78 and an oxygen permeability of at least about $75 \times 10^{-11}$ ($cm^2$sec) (ml $O_2 \times$ mm Hg).

16. An oxygen-permeable UV-absorbing lens as claimed in claim 15 in which the organosilicon monomer is selected from the group consisting of tris(trimethylsiloxy)-methacryloxypropylsilance, 1,3-bis-(γ-methacryloxypropyl)-1,1,3,3-tetra(-trimethylsiloxy)-disiloxane and mixtures thereof, and in which there is also present a has been hydroxyorganosilicon monomer is hydroxy-di(trimethylsiloxy)silylpropylmethacrylate.

17. An oxygen-permeable UV-absorbing lens as claimed in claim 15 in which the fluoroorgano monomer is 2,2,2-trifluoroethylmethacrylate, hexafluorobutylmethacrylate, hexfluoroisopropylmethacrylate and mixtures thereof.

* * * * *

UNITED STATES PATENT AND TRADEMARK OFFICE
CERTIFICATE OF CORRECTION

PATENT NO. : 5,084,537
DATED : January 28, 1992
INVENTOR(S) : Nick Stoyan It is certified that error appears in the above-identified patent and that said Letters Patent is hereby corrected as shown below:

On the title page, item (57):

ABSTRACT, line 5, delete "is" (second occurrence).

ABSTRACT, line 8, change "50X50$^{-11}$" to -- 50X10$^{-11}$ --.

ABSTRACT, line 10, change "fluoorgano" to
-- fluoroorgano --.

Column 3, line 14, after "monomers" insert a period.

Column 8, line 41, change "14-inch" to -- 14-inches --.

Column 8, line 42, before "discs" change "to" to
-- into --.

Column 8, line 57, change "sue" to -- use --.

Column 9, line 8, delete the line and insert
-- methacrylate --.

Column 9, line 19, change "(2-acryloyloxytehoxy)" to
-- (2-acryloyloxyethoxy) --.

Column 9, line 50, change "(2-acryloyloxytehoxy)" to
-- (2-acryloyloxyethoxy) --.

Column 9, line 63, change "1,3 bis($\gamma$-methacryloxy-" to
-- 1,3-bis($\gamma$-methacryloxy- --.

UNITED STATES PATENT AND TRADEMARK OFFICE
CERTIFICATE OF CORRECTION

PATENT NO. : 5,084,537

DATED : January 28, 1992

INVENTOR(S) : Nick Stoyan

It is certified that error appears in the above-identified patent and that said Letters Patent is hereby corrected as shown below:

Column 11, line 15, change "1,3 bis(γ-methacryloxypropyl)-" to -- 1,3-bis(γ-methacryloxypropyl)- --.

Column 11, line 20, change "Table II" to -- Table III --.

Column 11, line 39, after "and" delete "the".

Column 13, line 61, before "compounds" delete "the".

Column 13, line 68, change "wherein R' is" to -- wherein X' is --.

Column 14, line 31, change "1,3-bis-(γ-methacryloxypropyl-)" to -- 1,3-bis-(γ-methacryloxypropyl)- --.

Column 14, line 36, change "1,3-bis-(γ-methacryloxypropyl-)" to -- 1,3-bis-(γ-methacryloxypropyl)- --.

Column 14, line 39, change "fluoorgano" to -- fluoroorgano --.

Column 14, line 44, change "fluoorgano" to -- fluoroorgano --.

Column 14, line 49, change "fluoorgano" to -- fluoroorgano --.

UNITED STATES PATENT AND TRADEMARK OFFICE
CERTIFICATE OF CORRECTION

PATENT NO. : 5,084,537
DATED : January 28, 1992
INVENTOR(S) : Nick Stoyan

Page 3 of 3

It is certified that error appears in the above-identified patent and that said Letters Patent is hereby corrected as shown below:

Column 14, line 54, change "fluoorgano" to
-- fluoroorgano --.

Column 15, line 30, change "0.01" to -- 0.1 --.

Column 16, line 17, change "(cm$^2$sec) to -- (cm$^2$/sec) --.

Column 16, line 22, change "-methacryloxypropylsilance"
to -- -methacryloxypropylsilane --.

Column 16, line 25, after "present a" delete "has been".

Column 16, line 26, before "is" insert -- which --.

Column 16, line 30, change "hexfluoroisopropylmethacrylate"
to -- hexafluoroisopropylmethacrylate --.

Signed and Sealed this

Seventh Day of September, 1993

Attest:

BRUCE LEHMAN

*Attesting Officer*    Commissioner of Patents and Trademarks